United States Patent
Tausch et al.

(10) Patent No.: US 10,880,538 B2
(45) Date of Patent: Dec. 29, 2020

(54) METHOD AND APPARATUS FOR DETECTING AN OBJECT WITH CIRCULAR-ARC-SHAPED SUPPORTING ELEMENTS

(71) Applicant: FRAUNHOFER-GESELLSCHAFT ZUR FÖRDERUNG DER ANGEWANDTEN FORSCHUNG E.V., Munich (DE)

(72) Inventors: Reimar Tausch, Darmstadt (DE); Rafael Monroy, Freiburg (DE); Pedro Santos, Muenster (DE); Martin Ritz, Darmstadt (DE); Hendrik Schmedt, Bensheim (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 811 days.

(21) Appl. No.: 15/031,387

(22) PCT Filed: Oct. 21, 2014

(86) PCT No.: PCT/EP2014/072497
§ 371 (c)(1),
(2) Date: Aug. 15, 2016

(87) PCT Pub. No.: WO2015/059115
PCT Pub. Date: Apr. 30, 2015

(65) Prior Publication Data
US 2016/0360184 A1     Dec. 8, 2016

(30) Foreign Application Priority Data
Oct. 22, 2013  (DE) ........................ 10 2013 221 415

(51) Int. Cl.
*H04N 13/243*     (2018.01)
*H04N 13/254*     (2018.01)
(Continued)

(52) U.S. Cl.
CPC ......... *H04N 13/243* (2018.05); *G01B 11/245* (2013.01); *G01J 1/0271* (2013.01);
(Continued)

(58) Field of Classification Search
CPC ............. G03F 7/70108; G03F 7/70075; G03F 7/70825; G03F 7/702; G03F 7/70358;
(Continued)

(56) References Cited

U.S. PATENT DOCUMENTS 4,057,725 A   11/1977  Wagner
4,204,124 A    5/1980  Kowalski
(Continued)

FOREIGN PATENT DOCUMENTS

CH    702255 A1    5/2011
CN  102590150 A    7/2012
(Continued)

OTHER PUBLICATIONS http://cg.cs.uni-bonn.de/en/projects/btfdbb.
(Continued)

*Primary Examiner* — Farhan Mahmud
(74) *Attorney, Agent, or Firm* — Laurence A. Greenberg; Werner H. Sterner; Ralph E. Locher

(57) ABSTRACT

The invention relates to an apparatus for detecting an object. The apparatus includes a first circular-arc-shaped support element being rotatable about a first axis of rotation and a plurality of image detection devices disposed at the first circular-arc-shaped support element. At least one second circular-arc-shaped support element is rotatable about a second axis of rotation and a plurality of light sources is
(Continued)

disposed at the at least one second circular-arc-shaped support element. The first axis of rotation and the second axis of rotation intersect at least at one point of intersection. A method for detecting an object by using the apparatus is also provided.

15 Claims, 2 Drawing Sheets

(51) Int. Cl.
G01N 21/55 (2014.01)
G01B 11/245 (2006.01)
G06T 7/70 (2017.01)
G01J 1/02 (2006.01)
G01N 21/47 (2006.01)

(52) U.S. Cl.
CPC ............... *G01N 21/55* (2013.01); *G06T 7/70* (2017.01); *H04N 13/254* (2018.05); *G01N 2021/4711* (2013.01); *G01N 2021/4723* (2013.01); *G01N 2021/4735* (2013.01); *H04N 2213/001* (2013.01)

(58) Field of Classification Search
CPC ....... G01S 17/42; G01S 7/4817; G01B 11/24; G01B 11/002; G01B 11/26; F21Y 2115/10; G01C 15/002
See application file for complete search history.

(56) References Cited

U.S. PATENT DOCUMENTS

| | | | |
|---|---|---|---|
| 4,817,119 A | 3/1989 | Ledley et al. | |
| 4,849,643 A | 7/1989 | Mundy | |
| 4,894,551 A * | 1/1990 | Kishimoto | G01B 11/245 |
| | | | 250/559.23 |
| 5,008,555 A | 4/1991 | Mundy | |
| 5,912,741 A | 6/1999 | Carter et al. | |
| 5,932,874 A | 8/1999 | Legg et al. | |
| 6,161,941 A | 12/2000 | Tait et al. | |
| 6,407,818 B1 | 6/2002 | Whitehouse | |
| 6,974,964 B1 | 12/2005 | Wang | |
| 7,991,596 B2 | 8/2011 | Steenhoek | |
| 2003/0234786 A1 | 12/2003 | Cole et al. | |
| 2004/0252312 A1 | 12/2004 | Chen | |
| 2005/0117784 A1 | 6/2005 | Merbach et al. | |
| 2005/0218338 A1 * | 10/2005 | Wulf | G01N 21/6452 |
| | | | 250/458.1 |
| 2006/0233427 A1 | 10/2006 | Hauke et al. | |
| 2006/0249689 A1 | 11/2006 | Eustergerling et al. | |
| 2008/0056432 A1 | 3/2008 | Pack et al. | |
| 2008/0192258 A1 | 8/2008 | Wadman | |
| 2010/0094601 A1 | 4/2010 | Steenhoek | |
| 2011/0096150 A1 | 4/2011 | Wadman et al. | |
| 2011/0176147 A1 | 7/2011 | Marcil et al. | |
| 2011/0234621 A1 | 9/2011 | Steenhoek | |
| 2011/0250351 A1 | 10/2011 | Steenhoek | |
| 2012/0081700 A1 | 4/2012 | Kuo | |
| 2012/0194820 A1 | 8/2012 | Kuo | |

FOREIGN PATENT DOCUMENTS

| | | |
|---|---|---|
| DE | 19961428 A1 | 9/2001 |
| DE | 10025741 A1 | 11/2001 |
| DE | 20316085 U1 | 1/2004 |
| DE | 202013000050 U1 | 2/2013 |
| EP | 2251639 A1 | 11/2010 |
| GB | 2335488 A | 9/1999 |
| KR | 101185327 B1 | 9/2012 |
| KR | 101225443 B1 | 1/2013 |
| WO | 2007108288 A1 | 9/2007 |
| WO | 2014108108 A1 | 7/2014 |

OTHER PUBLICATIONS http://av.dfki.de/projects/orcam.
http://www.polymetric.de.
http://www.spheron.com.
Goesele et al., "Scene Reconstruction from Community Photo Collections", Cover Feature, IEEE Computer Society, 2010, pp. 48-53.
Hertzmann et al., "Example-Based Photometric Stereo: Shape Reconstruction with General, Varying BRDFs", IEEE Transactions on Pattern Analysis and Machine Intelligence, vol. 27, No. 8, Aug. 2005, pp. 1254-1264.
Ackermann et al., "Removing the Example from Example-Based Photometric Stereo", K.N. Kutulakos (Ed.) ECCV 2010 Workshops, Part II, LNCS 6554, pp. 197-210, Springer Verlag 2012.
Schwartz et al., "Dome II: A Parallelized BTF Acquisition System", Workshop on Material Appearance Modeling, The Eurographics Association 2013.
Wikipedia, "Bidirectional reflectance distribution function", https://en.wikipedia.org/wiki/Bidirectional_relectance_distribution_function.

* cited by examiner

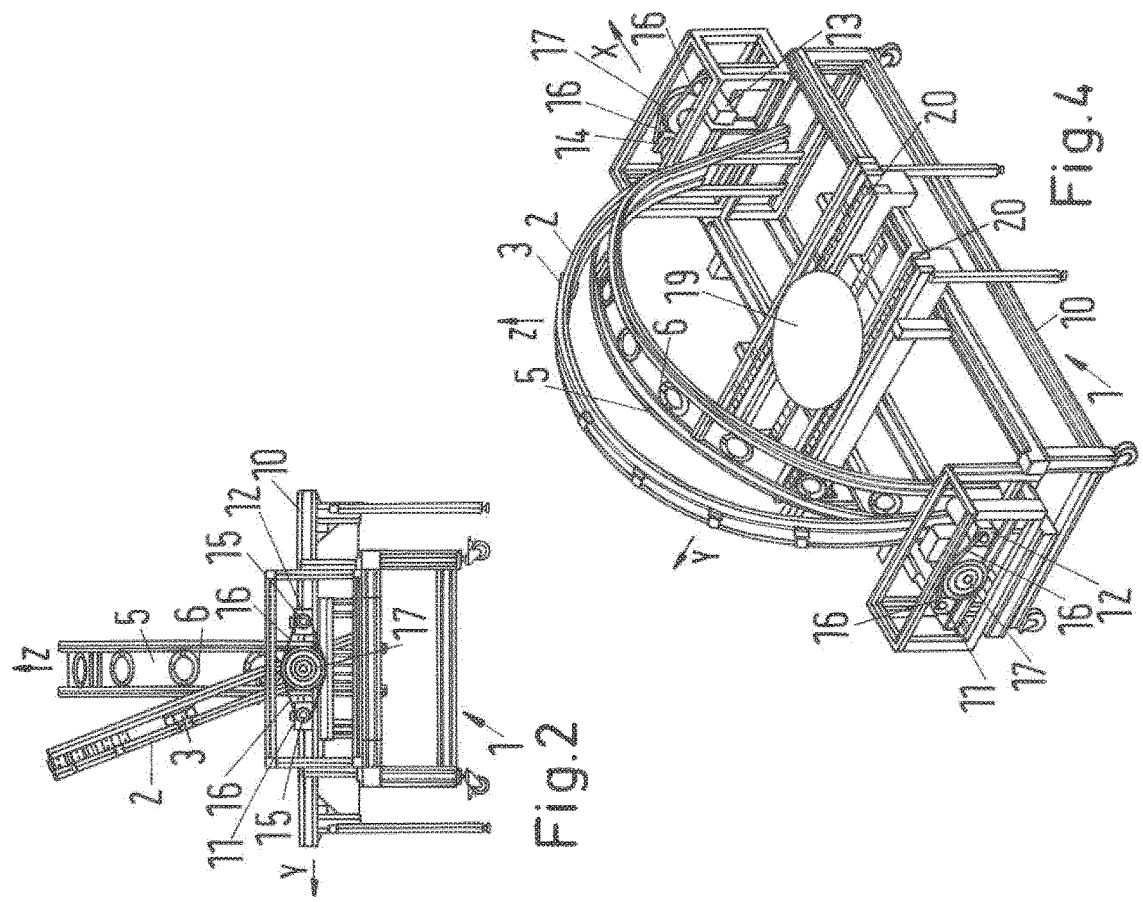
Fig. 1
Fig. 2
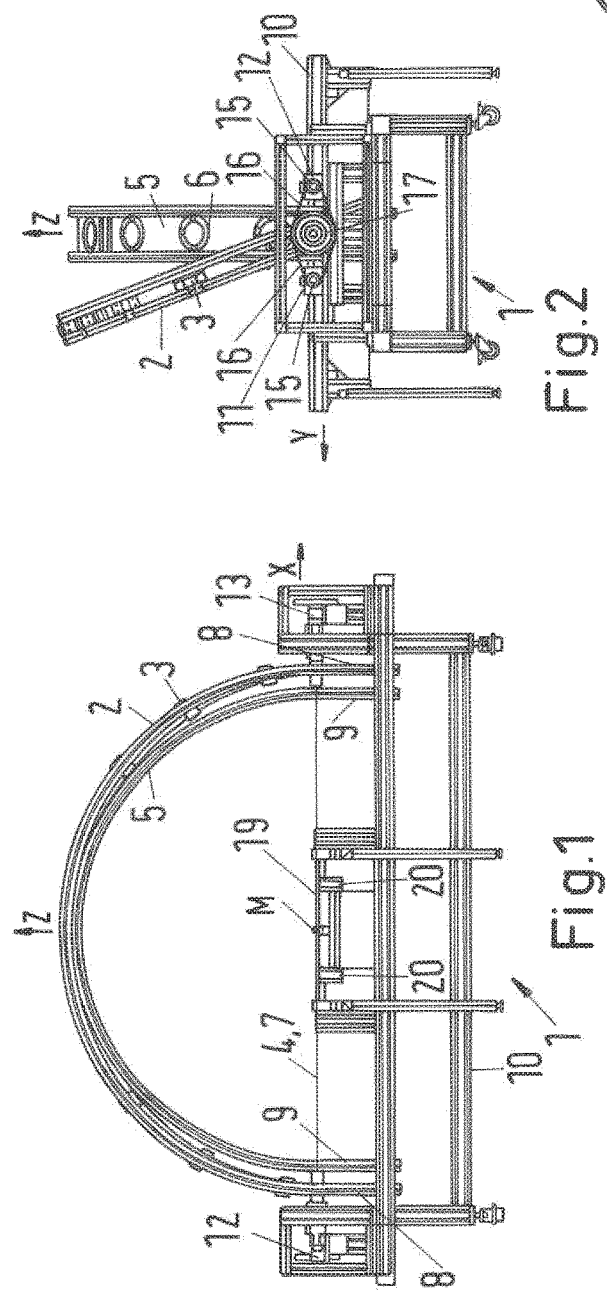
Fig. 3
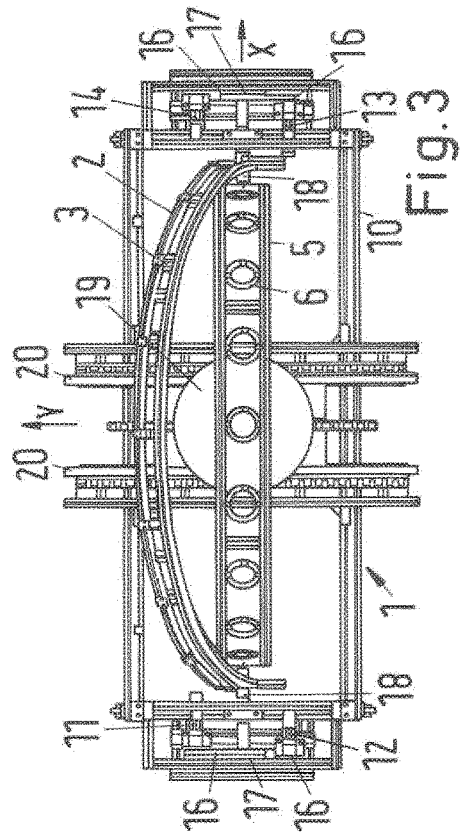
Fig. 4

METHOD AND APPARATUS FOR DETECTING AN OBJECT WITH CIRCULAR-ARC-SHAPED SUPPORTING ELEMENTS

BACKGROUND OF THE INVENTION

Field of the Invention

The invention relates to a method and an apparatus for detecting an object, in particular for an optical detection of a three-dimensional object.

The optical detection of properties of an object, for example a geometry, in particular a three-dimensional geometry, a texture and/or material properties, in particular optical material properties, generally requires much time outlay and the full attention of the operating staff during the entire process. The reason for this is that the detection elucidated above is carried out in many individual steps, the partial results of which then are ultimately combined to form a final result. Each one of these steps at least consists of precise positioning of a detection device relative to the object, which is currently complicated and also susceptible to errors and it is therefore able to adversely affect the quality of the detection. Furthermore, it may be necessary to undertake a renewed calibration of the detection device for each step.

Moreover, in a preparation step, the detection system has to be configured for each object to be detected and it has to be adapted to geometric parameters, e.g. to dimensions of the object to be detected.

However, high-quality detection of the properties elucidated above requires this multiplicity of detection steps. Therefore, it is necessary to find a compromise between minimizing the number of detection steps and maximizing the detection quality. In this case, it is desirable, in particular, to detect the object completely.

CH 702 255 A1 discloses an apparatus for three-dimensional detection of an object by means of optical scanning. Here, use is made of a camera with an associated illumination source. However, the camera and the illumination source are not movable independently of one another.

CN 102 590 150 A discloses a method for determining a hyper spectral bidirectional reflection distribution function. The system comprises a light source, wherein the light source can be moved by means of a fastening rod and a semicircle-shaped guide. However, in this case, only one light source is fastened to the semicircle-shaped arc.

KR 101 185 327 B discloses a rotatable arc-shaped camera holder. Here, it is possible to modify a breadth (latitude) of the camera along the arc.

U.S. Pat. No. 6,974,964 B1 discloses an apparatus and a method for detecting and collecting data relative to a position of a moving object. Here, the apparatus can comprise two light sources and four plane image sensors.

BRIEF SUMMARY OF THE INVENTION

A technical problem arising here is that of developing an apparatus and a method for detecting an object, which enable a temporally quick and high-quality detection of the object.

The solution of the technical problem emerges from the subject matter with the features described below. Further advantageous refinements of the invention emerge from the dependent claims.

An apparatus for detecting an object is proposed. Here, the detection denotes, in particular, an optical detection of properties of the object. Properties can be e.g. geometric properties, in particular a three-dimensional geometry, a texture and/or material properties of the object. In particular, the object can be a three-dimensional object.

The apparatus comprises a first circular-arc-shaped support element. Here, the first circular-arc-shaped support element can denote a circular-arc-shaped portion of a first support element which, in addition to the circular-arc-shaped portion, can also comprise further portions, e.g. straight end sections. However, the first support element can also consist of the first circular-arc-shaped support element only.

A number of image detection devices are arranged at the first circular-arc-shaped support element. Hence, at least two image detection devices are therefore arranged at the first circular-arc-shaped support element. Here, the image detection devices can be mechanically fastened directly to the first circular-arc-shaped support element. Naturally, the image detection devices can also be fastened indirectly to the first circular-arc-shaped support element, i.e. by way of e.g. mechanical connection elements. Here, the image detection devices can be fastened only at a predetermined position and/or with a predetermined orientation to the further circular-arc-shaped support element. However, the image detection devices can also be fastened to the first circular-arc-shaped support element in such a detachable manner that a position and/or orientation of the image detection devices is modifiable in a detached state and set in a fixed state. Within the meaning of this invention, the term image detection device comprises any device which can generate electric output signals in a manner dependent on optical input signals. In particular, the term image detection device can also comprise image detection devices with so-called matrix sensors, which enable the detection of an intensity of light rays from a detection region of the corresponding image detection device. Thus, an image detection device can be e.g. a camera, in particular a camera with a CCD sensor or CMOS sensor. Here, the image detection devices can detect light in a visible wavelength range, or else in a non-visible wavelength range.

Furthermore, the first circular-arc-shaped support element is rotatable about a first axis of rotation. In each angular position, the first circular-arc-shaped support element, in particular a central centerline of the first circular-arc-shaped support element, forms a circular arc of a circle, i.e. part of a complete circular line of the circle, which therefore is likewise rotatable about the first axis of rotation. The first axis of rotation is preferably a center of this circle, wherein the center denotes a straight line through the center point of the circle. Furthermore, the central (arc-shaped) centerline of the first circular-arc-shaped support element can intersect the axis of rotation at a point of intersection at at least one, in particular free, end of the first circular-arc-shaped support element. Figuratively speaking, this means that at least one end of the first circular-arc-shaped support element lies on the axis of rotation.

Therefore, the first circular-arc-shaped support element, and hence also the image detection devices, are movable along a spherical surface or part of the spherical surface of a first spherical volume.

The image detection devices are arranged at the first circular-arc-shaped support element, in particular in equiangular fashion. Equiangular means that an angular distance is the same between all image detection devices adjacent to one another along the first circular-arc-shaped support element. Here, the angular distance can be specified by e.g. a center point angle, wherein the center point angle is included by two radial lines which each extend through the center point and the arrangement point of adjacent image detection devices at the first circular-arc-shaped support element. The fact that the image detection devices are arranged at the first circular-arc-shaped support element in equiangular fashion can also include embodiments in which the angular distances are not exactly the same between various image detection devices adjacent to one another along the first circular-arc-shaped support element. By way of example, it is also possible to include embodiments in which the various angular distances, in particular adjacent angular distances and/or a minimum angular distance and a maximum angular distance of all angular distances, deviate from one another by no more than a maximum difference, e.g. due to tolerances, of e.g. no more than 1°, 2°, 3°, 4° or 5°.

Furthermore, the apparatus comprises at least one further circular-arc-shaped support element. Here, the further circular-arc-shaped support element can denote a circular-arc-shaped portion of a further support element which, in addition to the circular-arc-shaped portion, can also comprise further portions, e.g. straight end sections. However, the further support element can also consist of the further circular-arc-shaped support element only.

A number of light sources are arranged at the at least one further circular-arc-shaped support element. Here, at least two light sources are therefore arranged at the further circular-arc-shaped support element. In particular, as already elucidated above in relation to the image detection devices, the light sources can be fastened mechanically to the further circular-arc-shaped support element, either directly or indirectly. Here, the light sources can be fastened only at a predetermined position and/or with a predetermined orientation to the further circular-arc-shaped support element. However, a detachable mechanical connection is also conceivable in this case such that a position and/or orientation of the light sources is modifiable in a detached state and set in a fixed state.

The light sources are also arranged along the at least one further circular-arc-shaped support element in equiangular fashion. The fact that the light sources are arranged at the further circular-arc-shaped support element in equiangular fashion can also include embodiments in which the angular distances are not exactly the same between various light sources adjacent to one another along the further circular-arc-shaped support element. By way of example, it is also possible to include embodiments in which the various angular distances, in particular adjacent angular distances and/or a minimum angular distance and a maximum angular distance of all angular distances, deviate from one another by no more than a maximum difference, e.g. due to tolerances, of e.g. no more than 1°, 2°, 3°, 4° or 5°.

Within the meaning of this invention, the term light source comprises all devices for generating electromagnetic waves. However, in particular, a light source can generate light in the visible wavelength range. However, naturally, it is also conceivable that the light source generates light in the non-visible wavelength range.

The at least one further circular-arc-shaped support element is rotatable about a further axis of rotation. In each angular position, the at least one further circular-arc-shaped support element, in particular a central centerline of the at least one further circular-arc-shaped support element, forms a circular arc of a circle, i.e. part of a complete circular line of the circle, which therefore is likewise rotatable about the further axis of rotation. The further axis of rotation can be a center of this circle. Also, the central centerline of the further circular-arc-shaped support element can intersect the axis of rotation at at least one, in particular free, end of the further circular-arc-shaped support element at a point of intersection.

Therefore, the further circular-arc-shaped support element and also the light sources are movable along a spherical surface or part of the spherical surface of a second spherical volume.

Furthermore, the first axis of rotation and the further axis of rotation intersect at at least one point of intersection. As will still be elucidated in more detail below, this comprises the case where axes of rotation are also able to be superimposed on one another, i.e. are able to have more than one point of intersection, in particular an infinite number of points of intersection.

The feature according to which the first and the further axes of rotation intersect naturally also comprises embodiments in which there is an unwanted deviation between the first axis of rotation and the further axis of rotation, for example due to manufacturing tolerances and/or further parameters. Therefore, the feature means that the axes of rotation ideally intersect at at least one point of intersection, even if this is not the case in a specific mechanical embodiment, for example due to manufacturing tolerances or further environmental influences.

Preferably, the first axis of rotation and the further axis of rotation (ideally) intersect at the respective center points of the circular-arc-shaped support elements. Figuratively, this means that the center points of the circular-arc-shaped support elements and hence also of the spherical volumes elucidated above are superimposed on one another.

The first circular-arc-shaped support element and the at least one further circular-arc-shaped support element can have radii that differ from one another in this case. In particular, the first circular-arc-shaped support element can have a larger radius than the at least one further circular-arc-shaped support element. In this case, the first spherical volume encompasses the further spherical volume. However, the at least one further circular-arc-shaped support element can also have a larger radius than the first circular-arc-shaped support element. In particular, the radii of the first circular-arc-shaped support element and of the at least one further circular-arc-shaped support element can be selected in such a way that an unimpeded and independent movement of the first circular-arc-shaped support element and of the at least one further circular-arc-shaped support element about the respective axis of rotation is ensured.

Furthermore, it is possible for at least one image detection device, but preferably for all image detection devices, to be aligned toward the center point of the first circular-arc-shaped support element. This means that central optical axes of the image detection devices aligned toward the center point of the first circular-arc-shaped support element (ideally) intersect this center point. Here, a central optical axis can denote a central centerline of a detection region, for example of a conical or frustum-shaped detection region, of the image detection device. Accordingly, at least one light source, but preferably all light sources, can be aligned toward the center point of the at least one further circular-arc-shaped support element. This means that central beam axes of the light sources aligned toward the center point (ideally) intersect the center point of the further circular-arc-shaped support element. Here, the central beam axis can be, in particular, a central centerline of an illumination region, for example of a conical or frustum-shaped illumination region, of the light source.

The circular-arc-shaped support elements can each be mounted in a movable manner, for example at least one, in particular free, end, but preferably at both ends.

The number of image detection devices can equal the number of light sources. However, naturally, more or fewer image detection devices than light sources can also be used.

Preferably, all image detection devices are arranged at the first circular-arc-shaped support element in such a way that the distances of the image detection devices from the center point of the first circular-arc-shaped support element are the same. Accordingly, it is also possible for all light sources to be arranged along the at least one further circular-arc-shaped support element in such a way that distances of the light sources from the center point of the further circular-arc-shaped support element are the same.

Therefore, an object to be detected can advantageously be arranged in the spherical volume with the smaller radius. Thereafter, both the first circular-arc-shaped support element, and hence the image detection devices, and the further circular-arc-shaped support element, and hence also the light sources, can be moved around the object on the respectively assigned (sections of the) spherical surfaces. Advantageously, this enables a detection of (at least one part of) the object from a plurality of detection positions and with different detection directions and an illumination of the object from a plurality of illumination positions and with different illumination directions. This in turn advantageously enables a high-quality, but at the same time quick, optical detection of the object.

In particular, it is possible for 9 or more than 9 image detection devices to be arranged at the first circular-arc-shaped support element. It is also possible for 9 or more than 9 light sources to be arranged at the further circular-arc-shaped support element. The maximum number of arrange able image detection devices and light sources emerges from the geometric dimensions of the image detection devices and light sources and from the length of the respective circular-arc-shaped support element.

However, the achievable quality of the geometric properties and of the material properties increases with the number of image detection devices and light sources.

In a further embodiment, the number of light sources equals the number of image detection devices.

In a further embodiment, the image detection devices are arranged at the first circular-arc-shaped support element and the light sources are arranged at the further circular-arc-shaped support element in such a way that, in at least one angular position of the first circular-arc-shaped support element, preferably in all angular positions thereof, the further circular-arc-shaped support element is positionable in such a way that at least one image detection device and at least one light source are arranged on a radial line. Here, the radial line can relate to the center points elucidated above, in particular 226003 superimposing center points of the first and further circular-arc-shaped support elements and it can also be denoted as a common radial line. Therefore, it is thus possible for the first circular-arc-shaped support element and the further circular-arc-shaped support element each to be arranged at an angular position, wherein, at these angular positions, at least one image detection device and at least one light source are arranged on the radial line. Here, the image detection device can be arranged at a further distance from the center point than the light source.

In one arrangement of the light source and the image detection device on a radial line, the central optical axis of the image detection device and the central beam axis of the light source can be superimposed on one another, i.e. be arranged, in particular, in a collinear manner. Here, the central optical axis and the central beam axis can be arranged on the radial line, in particular be superimposed thereon.

Preferably, the further circular-arc-shaped support element is positionable in at least one angular position of the first circular-arc-shaped support element, preferably in all angular positions thereof, in such a way that a light source is also arranged on each radial line on which an image detection device is arranged and/or that an image detection device is also arranged on each radial line on which a light source is arranged.

Preferably, the angular distances between the image detection devices arranged in equiangular fashion along the first circular-arc-shaped support element can equal the angular distances between the light sources arranged in equiangular fashion along the further circular-arc-shaped support element. Angular positions of the image detection devices arranged in equiangular fashion along the first circular-arc-shaped support element and angular positions of the light sources arranged in equiangular fashion along the further circular-arc shaped support element can also be equal, it being possible that said angular positions relate, in particular, to a common reference coordinate system of the support elements.

In a preferred embodiment, the first circular-arc-shaped support element has a semicircle-shaped embodiment. In such an embodiment, the first circular-arc-shaped support element can be movably mounted at both, in particular free, ends. By way of example, the ends can be mounted in a movable, in particular rotatable, manner. In particular, the endpoints of the central centerline of the first circular-arc-shaped support element in each case can intersect the axis of rotation of the first circular-arc-shaped support element at both free ends.

Alternatively or cumulatively, the at least one further circular-arc-shaped support element can also have a semicircle-shaped embodiment. The further circular-arc-shaped support element can preferably also be movably mounted, in particular rotatably mounted, at both, in particular free, ends.

However, naturally, the invention is not restricted to semicircle-shaped support elements. In particular, at least one of the circular-arc-shaped support elements can also be embodied as a circular-arc segment with a predetermined center point angle greater than 0° and less than or equal to 360°. It is also conceivable to embody at least one of the circular-arc-shaped support elements in the shape of a quarter circle or even the shape of a full circle.

In a further preferred embodiment, the first axis of rotation and the further axis of rotation are superimposed on one another. This can mean that the first axis of rotation and the further axis of rotation are arranged collinearly and lie on one another. Also, the first circular-arc-shaped support element and the further circular-arc-shaped support element can each be movable along a hemisphere surface, wherein the common axis of rotation lies in a base circular area of the respective hemisphere. As a result of this, an illumination that is matched to the detection by means of the image detection devices advantageously emerges, as a result of which a quality of the detection is improved.

In a further embodiment, the first circular-arc-shaped support element is movable by means of at least one first actuator. Naturally, the first circular-arc-shaped support element can also be movable by a first actuator and a second actuator. By way of example, the at least one actuator can be mechanically coupled to the first circular-arc-shaped support element in such a way that the first circular-arc-shaped support element is movable about the first axis of rotation by, or by means of, the actuator. Within the meaning of this invention, an actuator is understood to mean any device for generating a drive force or drive energy, wherein the drive force or drive energy can cause the movement of the first circular-arc-shaped support element about the first axis of rotation.

By way of example, if the first circular-arc-shaped support element has a semicircle-shaped embodiment, a first actuator can be coupled to a first, in particular free, end of the first circular-arc-shaped support element and/or a second actuator can be coupled to a second, in particular free, end of the first circular-arc-shaped support element.

Accordingly, the at least one further circular-arc-shaped support element is movable by means of at least one further actuator. In accordance with the first circular-arc-shaped support element, the further circular-arc-shaped support element can also be movable by way of a plurality of actuators, in particular two actuators. If the at least one further circular-arc-shaped support element also has a semicircle-shaped embodiment, a first actuator can be coupled to the first, in particular free, end of the further circular-arc-shaped support element and/or a second actuator can be coupled to the second, in particular free, end of the further circular-arc-shaped support element.

What emerges as a result thereof in an advantageous manner is that the circular-arc-shaped support elements can be moved independently of one another, but with a high level of accuracy.

In a further embodiment, the first circular-arc-shaped support element is movable into at least a predetermined number of different angular positions relative to the first axis of rotation.

Alternatively or cumulatively, the at least one further circular-arc-shaped support element is movable into at least a predetermined number of different angular positions relative to the further axis of rotation.

By way of example, a reference coordinate system for moving the first circular-arc-shaped support element can be defined as follows. An origin of the reference coordinate system can be arranged at the point of intersection of the first axis of rotation and second axis of rotation. A longitudinal axis (x-axis) can extend along the first axis of rotation. A vertical axis (z-axis) can be oriented in a vertical direction, wherein a vertical direction is oriented, for example, counter to a direction of the gravitational force. Moreover, the vertical direction can be oriented perpendicular to a surface of an object support yet to be elucidated below. A lateral direction (y-direction) can be oriented perpendicular to the longitudinal direction and to the vertical direction.

Accordingly, a reference coordinate system can be defined for a movement of the further circular-arc-shaped support element, wherein the longitudinal axis of this reference coordinate system extends along the second axis of rotation.

There may be a reference position or zero position, for example, if the vertical axis elucidated above intersects the corresponding circular-arc-shaped support element. This reference position can be associated with an angular position of 0°. Therefore, the lateral axis of the reference coordinate system intersects the corresponding circular-arc-shaped support element at angular positions of +/−90°.

If the first circular-arc-shaped support element and the further circular-arc-shaped support element have a semicircle-shaped embodiment and if, in each case, N1 image detection devices and N2 light sources are arranged at the respective support elements and if each of these support elements can be moved into M angular positions, this results in N1×M detection positions and N2×M illumination positions.

Preferably, a number, and optionally also an angular spacing, of image detection devices and/or light sources and a number, and optionally also an angular spacing, of angular positions of the first arc-shaped support element and/or of the at least one further arc-shaped support element are selected in such a way that illumination positions and/or detection positions are distributed in equiangular fashion in two dimensions on the corresponding spherical surface.

Furthermore, the predetermined angular positions into which the first circular-arc-shaped support element can be moved can be selected to equal the predetermined angular positions into which the further circular-arc-shaped support element can be moved. This is relevant, in particular, for the embodiment in which the first axis of rotation and the second axis of rotation are superimposed on one another. In this case, the reference coordinate system for the movement of the first circular-arc-shaped support element corresponds to the reference coordinate system for the movement of the at least one further circular-arc-shaped support element and said reference coordinate system can be denoted as a common reference coordinate system.

It is also possible for the predetermined angular positions of the two circular-arc-shaped support elements to be selected to be different from one another. In this case, there advantageously is no, or only little, masking of the detection devices by the light sources, or vice versa.

The number of different predetermined angular positions of the corresponding circular-arc-shaped support element can, for example, be discrete angular positions. This means that the circular-arc-shaped support elements are only movable into these discrete angular positions, for example by way of the actuator associated therewith. By way of example, the actuators can be embodied as stepper motors, wherein individual steps of the stepper motors correspond to individual discrete angular positions of the corresponding circular-arc-shaped support element.

In a preferred embodiment, the light sources are embodied as ring lights. Here, a ring light has a central opening, wherein the light source is arranged at least around part of the central opening, for example along a circumference of the central opening. However, in this case, a ring light is not necessarily understood to mean a light source with a circular or cylindrical central opening. In particular, a ring light can also have a rectangular or cuboid central opening.

However, if the ring light has a circular or cylindrical central opening, a radius of this opening preferably is equal to or greater than a maximum dimension of a detection region of an image detection device in a cross section through this detection region if the central optical axis of the image detection device and the central beam axis of the light source are superimposed on one another, wherein a center point of the central opening of the ring light is arranged in the cross-sectional plane and the cross-sectional plane is oriented perpendicular to the central optical axis of the image detection device. Here, the center point of the central opening of the ring light can be a center point of an opening with a circular embodiment or it can lie on a central center axis of a cylindrical opening.

In particular, the circular-arc-shaped support elements can be movable in such a way that center points of the central openings of the ring lights can in each case be arranged on central optical axes of respectively one image detection device. In particular, it is therefore possible to select angular positions accordingly, for example the discrete angular positions elucidated above. In this case, a synchronous movement of the circular-arc-shaped support elements is conceivable, as a result of which a detection of the object by the image detection devices is advantageously not impeded by the light sources embodied as ring lights.

Here, the embodiment of the light sources as ring lights can also take place independently of an equiangular arrangement of the image detection devices and an equiangular arrangement of the light sources.

Hence, an apparatus for detecting an object is described, wherein the apparatus comprises a first circular-arc-shaped support element, wherein a number of image detection devices are arranged at the first circular-arc-shaped support element, wherein the first circular-arc-shaped support element is rotatable about a first axis of rotation, wherein the apparatus comprises at least one further circular-arc-shaped support element, wherein a number of light sources are arranged at the at least one further circular-arc-shaped support element, wherein the at least one further circular-arc-shaped support element is rotatable about a further axis of rotation, wherein the first axis of rotation and the further axis of rotation intersect at at least one point of intersection. Furthermore, the light sources are embodied as ring lights. Here, this apparatus can likewise be developed in accordance with the aspects and embodiments described above and in the following text. In particular, it is also the case here that at least two image detection devices are arranged at the first circular-arc-shaped support element and at least two light sources are arranged at the further circular-arc-shaped support element.

The apparatus can furthermore comprise an object support, wherein an object to be detected can be arranged on a surface of the object support. In particular, the object support can be arranged in such a way that at least one of the axes of rotation, but in particular both axes of rotation, extend(s) in a surface plane of the object support. Also, the object support can be arranged in such a way that the point of intersection of the first axis of rotation and the second axis of rotation, elucidated above, is arranged in a surface plane.

Furthermore, the apparatus can comprise a device for moving the object support or the object. By way of example, the object support can be embodied as a conveyor belt or be arranged on a conveyor belt.

Results of practical trials have shown that the determination of material information, which is desired in addition to the determination of geometric properties, is possible with sufficient reliability and quality, in particular if
  a) both detection positions (=positions of the image detection devices) and illumination positions (=positions of the light sources) are arrangeable in a sufficient and uniformly distributed number on one hemisphere around the object to be detected, in particular in such a way that the positions which can be set cover the hemisphere sufficiently densely and uniformly,
  b) the detection positions and the illumination positions can be set completely independently of one another on the respective hemispheres, i.e., in particular, if each position in the set of obtainable detection positions can be combined with any position in the set of obtainable illumination positions, and vice versa,
  c) also, in particular, for each obtainable illumination position/detection position, the respectively other position can be arranged on the same radial line in relation to the center point of the hemisphere in such a way that there is exactly one illumination position for each detection position in which a light cone illuminates the object in the center in an unimpeded fashion along the central optical axis of the image detection device, without the field of view of the image detection device being impaired by the light source.

Furthermore, a method is proposed for detecting an object by means of one of the apparatuses according to one of the embodiments elucidated above.

According to the invention, at least one illumination state is set, wherein an illumination state is set by setting an angular position of the at least one further circular-arc-shaped support element and by setting an activation state of at least one light source. Hence, an illumination state is therefore defined by an angular position of the further circular-arc-shaped support element and by an activation state of the light sources. Here, the angular position is measured relative to the respective axis of rotation or to the longitudinal axis of the reference coordinate system elucidated above. Here, the angular position can be specified by an angle of rotation in relation to this axis of rotation.

Furthermore, at least one imaging state is set, wherein the imaging state is set by setting an angular position of the first circular-arc-shaped support element and by setting an activation state of at least one of the image detection devices. Hence, the imaging state is therefore defined by the angular position of the first circular-arc-shaped support element and by the activation state of the image detection devices.

The activated image detection devices each generate an image in the set illumination state and imaging state.

By way of example, if the apparatus comprises N image detection devices and if all image detection devices are activated in the imaging state, N images are generated in a predetermined illumination state and a predetermined imaging state. By way of example, these can be stored in a storage device. Preferably, both the generated images and the illumination and imaging states associated with the images are stored. This advantageously enables a simple reconstruction of geometric properties and a simple determination of textures and material properties, which is yet to be elucidated in more detail below.

Naturally, the object to be detected can be arranged in one of the spherical volumes elucidated above, in particular in the spherical volume with the smaller radius, in a preparation step. This spherical volume can correspond to a detection volume of the apparatus or it can contain this detection volume.

Likewise, both the first circular-arc-shaped support element and the at least one further circular-arc-shaped support element can be moved into an initial angular position. By way of example, the initial angular position can be given by an angular position of +90°, 0° or −90° in relation to the reference coordinate system, elucidated above, of the corresponding circular-arc-shaped support element.

In a preferred embodiment, a predetermined number of mutually different imaging states and/or a predetermined number of mutually different illumination states are set, wherein the activated image detection devices each generate an image in each set illumination state and imaging state.

Preferably, all image detection devices are activated in each imaging state. Therefore, depending on the number of imaging states and illumination states, a large number of images advantageously emerge from different observation directions, subsequently enabling a high-quality detection of the object.

In a preferred embodiment, a number of different imaging states are set. By way of example, the different imaging states can be set by virtue of the first circular-arc-shaped support element being moved, in particular being moved sequentially, into different, in particular discrete, angular positions. In so doing, all image detection devices can be activated in each imaging state.

A number of different angular positions of the at least one further circular-arc-shaped support element are respectively set in each set imaging state. By way of example, different angular positions, in particular different discrete angular positions, can be set sequentially.

Furthermore, the light sources are activated sequentially in each set angular position of the at least one further circular-arc-shaped support element. Here, it is possible that only one light source is activated. This means that the already activated light source(s) is/are deactivated prior to, or during, the activation of a light source. Alternatively, all light sources already activated can remain in the activated state when activating a still deactivated light source.

As a result of this, a sequence of steps advantageously emerges for the detection, which is as quick as possible but, at the same time, of high quality as well, of an object since the object is optically detected from a plurality of directions under very different illumination scenarios.

In particular, this method renders possible the determination, yet to be elucidated in more detail below, of geometric information of the object in a manner dependent on the generated imaging information, in particular by means of a so-called multi-view stereo method (MVS method) and/or a photometric stereo method (PS method).

At the same time, the determination of material information on the basis of the same imaging information is also rendered possible. In particular, material information can be determined by means of a so-called bidirectional texture function (BTF) and/or a bidirectional reflectance distribution function (BRDF). This is yet to be elucidated in more detail below.

Therefore, the proposed embodiment of the apparatus for detecting an object, comprising at least two mutually independently movable circular-arc-shaped support elements, enables a generation, quick in terms of time, of the images required for determining geometric information and the material information. In particular, movement paths of the circular-arc-shaped support elements can be selected in such a way that a detection time is minimized. By way of example, in a first angular position of the first circular-arc-shaped support element, the further circular-arc-shaped support element can be moved sequentially from an initial angular position into a final angular position. After the final angular position is reached, the first circular-arc-shaped support element can then be moved into the next angular position. In this angular position, the further circular-arc-shaped support element can then be moved sequentially from the final angular position into the initial angular position. In so doing, images can be generated in each one of the imaging and illumination states given by the angular positions. As a result, both the "outward leg" of the further circular-arc-shaped support element and the "return leg" are used for generating images.

Hence, it is therefore possible to use the imaging information, which is generated in the imaging states and/or illumination states which can be set by the proposed apparatus, both for determining geometric properties and for determining material information.

In an alternative embodiment, the imaging and illumination states are set in such a way that the angular positions of the first circular-arc-shaped support element and of the at least one further circular-arc-shaped support element are the same. This is advantageous, in particular, in the embodiment elucidated above which has axes of rotation superimposed on one another as a synchronous movement of the circular-arc-shaped support elements emerges as a result thereof.

In other words, this means that the angular positions of the circular-arc-shaped support elements are set in such a way that central optical axes of at least one part of the image detection device are superimposed on central beam axes of at least some of the light sources.

As a result of this, there advantageously is an illumination that is ideally matched to the respective imaging state since regions of the object which are arranged in detection regions of the image detection device are preferably illuminated.

In a further embodiment, an object is moved through a spherical volume with a predetermined movement direction, said spherical volume being associated with the spherical surface along which the first or the at least one further circular-arc-shaped support element is movable. Furthermore, imaging and illumination states are set depending on a position of the object along the movement direction in such a way that the circular-arc-shaped support elements and the object are moved relative to one another in such a way that there is no collision between the object and circular-arc-shaped support elements. By way of example, the imaging and illumination states can be set in such a way that the circular-arc-shaped support elements are moved from a semi-plane in front of the object in the movement direction into a semi-plane behind the object in the movement direction while the object moves through the spherical volume. Here, the semi-plane can be oriented perpendicular to the movement direction and intersect the object to be detected; in particular, it can intersect the latter at a center point, for example a geometric center point.

As a result, there advantageously is a reliable detection of moving objects by means of the proposed apparatus.

In a further embodiment, geometric information or properties and/or material information or properties of an imaged object are determined depending on the generated imaging information.

By way of example, geometric information can be determined by the MVS method mentioned above. Here, a three-dimensional reconstruction of points on a surface of the object to be detected is generated in a manner dependent on a multiplicity of two-dimensional images which were generated from various perspectives, wherein at least part of the object to be detected, preferably the entire object to be detected, is imaged in each one of these images. To this end, it may be necessary for coordinate systems of the image detection devices to be known in a global coordinate system (registration).

In the PS method, already mentioned above, geometric information is generated in a manner dependent on a multiplicity of two-dimensional images, wherein the images are recorded from a specific perspective in each case and in each case image at least part of the object, with, however, the images being generated with different illumination scenarios, in particular illumination angles. As a result of this, it is possible to determine directions of the normals of portions of the object surface. This can be repeated for different imaging perspectives. Then, depth information can be generated in a manner dependent on the information relating to the normals elucidated above, for example by interpolating the information relating to the normals.

It is also possible to combine the MVS method and the PS method in order to enable an improved determination of geometric information.

By way of example, a model of the detected object in the form of a set of three-dimensional surface points (point cloud) can be generated from the images by means of the MVS method and/or the PS method. Then, a surface of the object can be determined in a manner dependent on this set. By way of example, the surface can be modeled in the form of triangles which are generated between geographically adjacent surface points. Hence, the surface of the object can be generated in a manner dependent on a topology of the surface points.

By way of example, material information can be determined by means of the BTF mentioned above.

Material information can also be determined by means of the BRDF already mentioned above.

The BTF denotes a distribution function which relates to the descriptions of surfaces ("textures"), which detect not only the reflection properties at a specific point but also contain the illumination-dependent and point-of-view-dependent behavior of the entire surface structure. It constitutes an extension of the BRDF. It is possible to achieve a high degree of realism under changing illuminations by applying the BTF or BRDF.

For the purposes of determining material information by means of the BTF, the first circular-arc-shaped support element, on which e.g. N image detection devices are arranged, can be moved into N discrete angular positions. Furthermore, the further circular-arc-shaped support element, on which e.g. M light sources are arranged, can be moved into M discrete angular positions.

Then, the first circular-arc-shaped support element can be moved sequentially into each one of the N angular positions, wherein, in each one of these angular positions, the further circular-arc-shaped support element is moved sequentially into each one of the M angular positions of the further circular-arc-shaped support element and the light sources are activated in sequence in each of these angular positions. If all light sources were activated in one angular position, the further circular-arc-shaped support element is moved into the next angular position, with there being another sequential activation of the light sources. If the further circular-arc-shaped support element was moved into all angular positions and if all light sources were activated in sequence in this angular position, the first circular-arc-shaped support element is moved into the next angular position and the further circular-arc-shaped support element is moved into the first angular position, with there then once again being another sequential activation of the light sources.

Naturally, there can also be sequential deactivation of the light sources after the movement of the further circular-arc-shaped support element into the next angular position.

Naturally, the further circular-arc-shaped support element can also remain in the angular position which was set last after the movement of the first circular-arc-shaped support element into the next angular position, with there then once again being another sequential activation of the light sources. Thereafter, the further circular-arc-shaped support element is once again moved sequentially into the first angular position.

All image detection devices can each generate one image in each angular position of the first circular-arc-shaped support element and of the further circular-arc-shaped support element and after each activation of a light source. Thus, N×N×M×M different imager-images, i.e. $N^4$ images in the case of N=M, emerge. Here, all angular positions of the first circular-arc-shaped support element and of the further circular-arc-shaped support element can be the same. Preferably, image detection devices with a matrix-like image sensor are used for the BTF, i.e. wherein a two-dimensional image with a predetermined number of pixels is generated.

This proposed sequence can likewise be applied for the purposes of determining material information by means of the BRDF. However, if image detection devices with matrix-like image sensors are used to this end, it is possible to determine a reference intensity in a manner dependent on the intensities of the predetermined number of pixels of an image since only one intensity value is required for the BRDF from a specific imaging perspective. It is also possible to subdivide a two-dimensional image into a plurality of portions, e.g. into four quadrants, and to determine, in each case, a reference intensity specific to the portion in a manner dependent on the pixels of a portion. By way of example, the reference intensity can be determined by averaging the intensity values of the pixels. Thus, as a result of this, an imaging perspective provided by the position and orientation of an image detection device is subdivided into a number of virtual imaging perspectives, wherein the number of virtual imaging perspectives corresponds to the number of portions. As a result, there is an increase in a number of perspectives, without it being necessary to drive to more angular positions. What emerges overall in an advantageous manner is that the proposed apparatus is suitable for generating images which can be used both for the BTF and the BRDF, in particular even if matrix-like image sensors are used.

The methods for determining geometric information and material information elucidated above are advantageously based on the same imaging information. Hence, the proposed apparatus and the proposed methods advantageously enable a generation of imaging information which can be used for determining both geometric information and material information. By way of example, geometric information and material information can be determined parallel in time, as a result of which there can be temporally quicker determination of properties of the object. Advantageously, it is also not necessary to run through different sequences of imaging and illumination states in order to determine both geometric information and material information.

BRIEF DESCRIPTION OF THE SEVERAL VIEWS OF THE DRAWING

The invention is elucidated in more detail on the basis of a plurality of exemplary embodiments. In detail:

FIG. 1 shows a front view of an apparatus according to the invention,

FIG. 2 shows a side view of the apparatus depicted in FIG. 1,

FIG. 3 shows a plan view of the apparatus depicted in FIG. 1,

FIG. 4 shows a perspective view of the apparatus depicted in FIG. 1,

Figure 5:
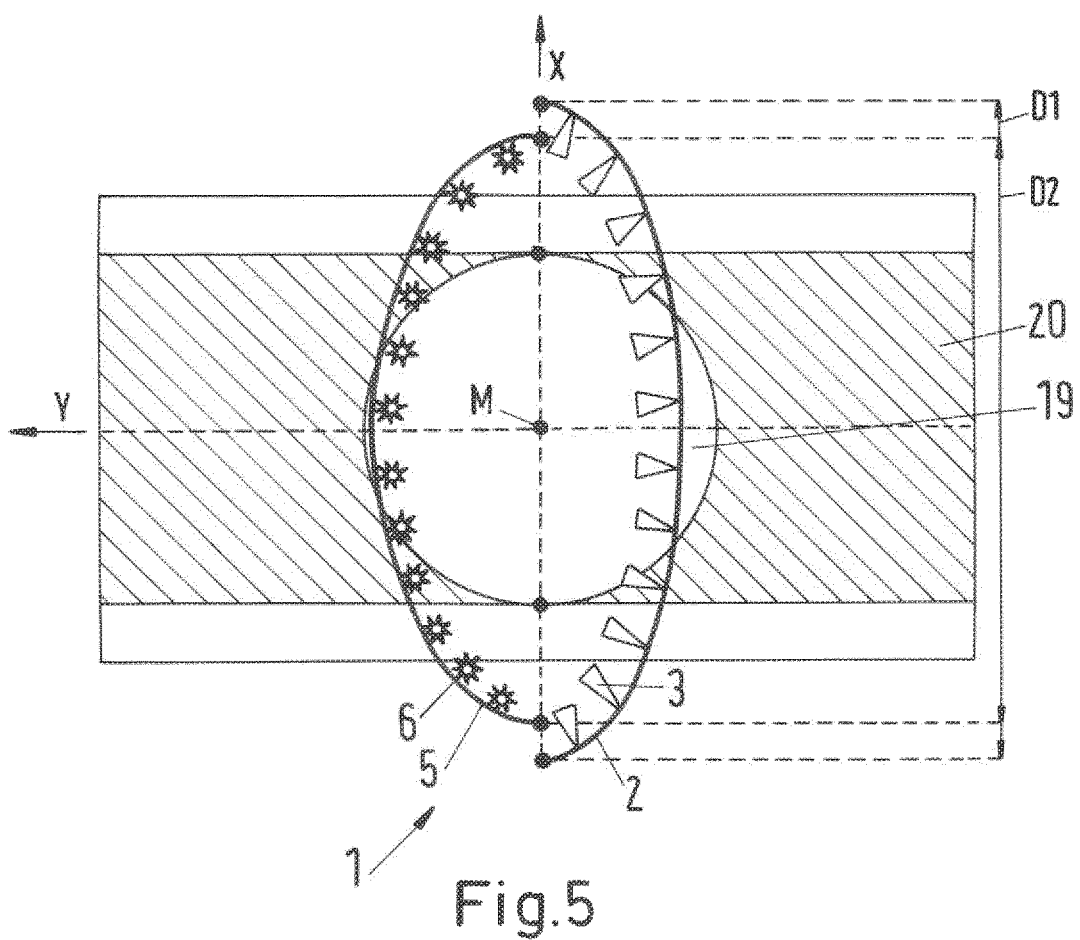
FIG. 5 shows a schematic depiction of an apparatus according to the invention with a conveyor belt.

Below, the same reference signs denote elements with the same or similar technical features.

DESCRIPTION OF THE INVENTION

FIG. 1 depicts a front view of an apparatus 1 according to the invention for detecting an object not depicted here. The apparatus 1 comprises a first circular-arc-shaped support element 2, with a first number of image detection devices 3 being fastened to the first circular-arc-shaped support element 2. Here, only one image detection device 3 is denoted by a reference sign for reasons of clarity. The first circular-arc-shaped support element 2 is rotatable about a first axis of rotation 4.

Furthermore, the apparatus 1 comprises a further circular-arc-shaped support element 5, with a second number of light sources 6 (see FIG. 2) being arranged at the further circular-arc-shaped support element 5. Only one light source 6 is denoted by a reference sign in FIG. 2 for reasons of clarity. The further circular-arc-shaped support element 5 is rotatable about a further axis of rotation 7.

FIG. 1 depicts that the first axis of rotation 4 and the further axis of rotation 7 are superimposed on one another. What is likewise depicted is that the axes of rotation 4, 7 extend along a longitudinal axis x of a reference coordinate system. A vertical axis z of the reference coordinate system and an origin of the reference coordinate system, which is arranged at a center point M of the first circular-arc-shaped support element 2 and the further circular-arc-shaped support element 5, are likewise depicted. Hence, the first circular-arc-shaped support element 2 and the further circular-arc-shaped support element 5 therefore have a common center point M. FIG. 3 additionally also depicts a lateral axis y of the reference coordinate system.

The first circular-arc-shaped support element 2 and the further circular-arc-shaped support element 5 are embodied as semicircle-shaped sections of one support element in each case. FIG. 1 depicts that the support elements each comprise straight end sections 8, 9 in addition to the first circular-arc-shaped support element 2 and the further circular-arc-shaped support element 5, which straight end sections extend away from the end of the respective semicircle-shaped section 2, 5.

FIG. 1 furthermore depicts a support structure 10 of the apparatus 1, with servomotors 11, 12, 13, 14 (see FIG. 4) and coupling elements being fastened to the support structure 10. Here, the support structure 10 can consist of profile elements and it can be mounted in a movable manner on rollers.

An object support 19, which has a cylinder-shaped embodiment and which is fastened to conveyor belts 20, is also depicted. The conveyor belts 20, and hence the object support 19 as well, are movable along the lateral y-axis (see FIG. 2) by means of a drive device not denoted in any more detail here. Here, the conveyor belts 20 can likewise be mounted on the support structure 10.

FIG. 2 depicts a side view of the apparatus 1 depicted in FIG. 1. In relation to the longitudinal x-axis (see FIG. 1) of the reference coordinate system, the further circular-arc-shaped support element 5 is situated at an angular position of 0°. The first circular-arc-shaped support element 2 is situated at an angular position of −20°. Furthermore, a first actuator 11 for driving the first circular-arc-shaped support element 2 is depicted. The first actuator 11 has a driveshaft 15, which is coupled to a coupling element 17 of a double shaft 18 (see FIG. 3) by way of a belt 16. Here, the double shaft 18 comprises a first shaft element not depicted here, wherein the first circular-arc-shaped support element 2 is flange-mounted onto the first shaft element. Here, the driveshaft 15 of the first actuator 11 is connected to the first shaft element of the double shaft 18 by way of the belt 16. By way of example, the first shaft element of the double shaft 18 can have a hollow cylindrical embodiment.

Furthermore, the double shaft 18 comprises a second shaft element not depicted here, which can be arranged e.g. in an interior volume of the hollow cylinder-shaped first shaft element. The further circular-arc-shaped support element 5 is flange-mounted onto this further shaft element of the double shaft 18. A second actuator 12 is coupled to the further shaft element by way of a belt 16 and the coupling element 17, wherein the further circular-arc-shaped support element 5 is drivable by way of the second actuator 12. In particular, this renders it possible to drive the first circular-arc-shaped support element 2 and the further circular-arc-shaped support element 5 independently of one another.

FIG. 3 depicts a plan view of the apparatus 1 depicted in FIG. 1. Here, in particular, a third actuator 13 and a fourth actuator 14 are depicted. What is depicted here is that the first circular-arc-shaped support element 2 is flange-mounted onto a further end of the semicircle-shaped section at a first shaft element of a further double shaft 18. In accordance with the explanations made above, the first shaft element is connected by way of a further coupling element 17 and a belt 16 to a driveshaft (not depicted here) of the third actuator 13. Likewise, a further shaft element (not depicted here) of the further double shaft 18 is coupled by way of the coupling element 17 and a belt 16 with a driveshaft, not depicted here, of the fourth actuator 14. Furthermore, the further circular-arc-shaped support element 5 is flange-mounted onto a further end of the semicircle-shaped section at the further shaft element of the further double shaft 18.

Therefore, the first circular-arc-shaped support element 2 is movable, in particular swivelable about the first axis of rotation 4, by way of the actuators 11, 13. Likewise, the further circular-arc-shaped support element 5 is movable, in particular swivelable about the second axis of rotation 7, by way of the actuators 12, 14.

Here, it is possible that the circular-arc-shaped support elements 2, 5 are only movable into predetermined, discrete angular positions by way of the actuators 11, 12, 13, 14.

It is also possible that a minimum angular position that can be set is −90°, wherein a maximum angular position that can be set is 90°. This relates to both the first circular-arc-shaped support element 2 and the further circular-arc-shaped support element 5.

FIG. 4 depicts a perspective view of the apparatus 1 depicted in FIG. 1. By way of example, an object to be detected can be arranged in a detection volume V (see FIG. 6). By way of example, the detection volume V can be enclosed by a spherical volume, wherein the further circular-arc-shaped support element 5 is moved along a spherical surface of this spherical volume during a rotational movement. Naturally, the detection volume can also be smaller than this spherical volume in order to observe necessary safety margins. In particular, the object to be detected can also be arranged on a horizontal plane which is defined by the longitudinal x-axis and the lateral y-axis. In particular, the object to be detected can also be arranged centered in the detection volume V, wherein the object to be detected is arranged in the region of the center point M (see FIG. 1) of the reference coordinate system.

In order to detect the object, the first circular-arc-shaped support element can then be moved sequentially into various angular positions, for example from the angular range of −90° (inclusive) to +90° (inclusive). Likewise, the further circular-arc-shaped support element can be moved into various angular positions from an angular range of −90° (inclusive) to +90° (inclusive). It is also possible to sequentially activate light sources 6 in each one of these angular positions. As a result of this, as already elucidated above, different imaging and illumination states emerge. An image can then be generated in each imaging and illumination state by each one of the image detection devices 3.

FIG. 5 depicts a schematic plan view of an apparatus 1 according to the invention. The apparatus 1 once again comprises a first circular-arc-shaped support element 2, wherein a number of image detection devices 3 are arranged along the circular-arc-shaped support element 2. A number of light sources 6 are arranged at a further circular-arc-shaped support element 5. What is depicted here is that a diameter D1 of the first circular-arc-shaped support element 2 is greater than a diameter D2 of the further circular-arc-shaped support element 5.

Furthermore, an object support 19, which has a cylindrical embodiment and which is fastened on a conveyor belt 20, is depicted. Here, the conveyor belt 20 is movable along the lateral y-axis with a movement direction in a shaft direction denoted by an arrow. Hence, the object support 19 and an object to be detected arranged thereon can be moved through a detection volume V (see FIG. 6) of the apparatus 1. Here, the object support 19 is arranged in such a way that a surface of the object support 19 is arranged orthogonally in relation to a vertical z-axis (see e.g. FIG. 2) and lies in a horizontal plane which is defined by the longitudinal x-axis and the lateral y-axis. In the state depicted in FIG. 5, a center point of the object support 19 is situated at a center point M of the circular-arc-shaped support elements 2, 5.

For the purposes of detecting an object, arranged on the object support 19, moving in the movement direction, it is possible to move both circular-arc-shaped support elements into an angular position of −90° in each case when the object support 19 or the object is arranged behind the center point M of the circular-arc-shaped support elements 2, 5 in the movement direction. As soon as a front end of the object support 19 or of the object in the movement direction reaches the center point M, an angular position of the circular-arc-shaped support elements can be modified from −90° to 0°, as a result of which these are positioned over the object. Naturally, it is possible here to set a predetermined number of intermediate angular positions between the angles of −90° and 0°. If a rear end of the object support 19 or of the object in the movement direction reaches the center point M, it is possible to modify an angular position of the circular-arc-shaped support elements from 0° to +90°. Here too, it is naturally possible to set various intermediate angular positions during the movement from the angular position of 0° to the angular position of +90°.

Here, it is possible for the circular-arc-shaped support elements 2, 5 to be moved synchronously and for the same angular position to be set in each case. However, the circular-arc-shaped support elements 2, 5 can naturally be actuated independently of one another as well, in particular in a non-synchronous manner and with different angular positions.

For the purposes of detecting static objects, i.e. objects arranged in a stationary manner, in the detection volume V, the angular position of the first circular-arc-shaped support element 2 and of the further circular-arc-shaped support element 5 can be set to 0° in a preparation step. Then, the object can be introduced into the detection volume V. Then, it is possible to set various imaging and illumination states, wherein different angular positions of the circular-arc-shaped support elements 2, 5, for example in a range from −90° (inclusive) to +90° (inclusive), can be set in the various imaging and illumination states.

Figure 6:
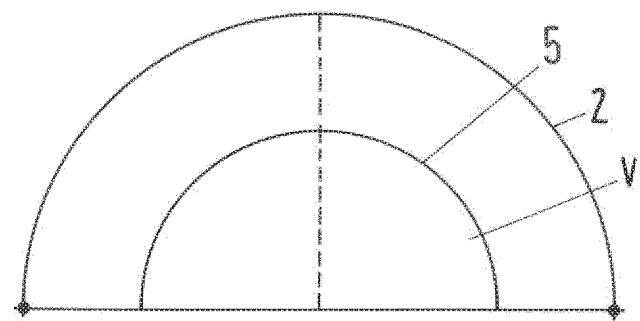
FIG. 6 shows a schematic depiction of a detection region.

FIG. 6 depicts a detection volume V of the apparatus 1 depicted in FIG. 1 in an exemplary manner. Here, the first circular-arc-shaped support element 2 and the further circular-arc-shaped support element 5 are depicted schematically. Here, the detection volume V can have a hemispherical shape in particular.

The proposed apparatus advantageously enables the arrangement of image detection devices 3 and light sources 6 at various positions with a predetermined level of discretization. In particular, no human interaction is required during the optical detection of the object. As explained in relation to FIG. 5, the apparatus can also be used to detect an object of arbitrary length which is moved through the detection volume V.

LIST OF REFERENCE SIGNS

1 Apparatus
2 First circular-arc-shaped support element
3 Image detection device
4 First axis of rotation
5 Further circular-arc-shaped support element
6 Light source
7 Second axis of rotation
8 End section
9 section
10 Support structure
11 First actuator
12 Second actuator
13 Third actuator
14 Fourth actuator
15 Driveshaft
16 Belt
17 Coupling element
18 Double shaft
19 Object support
20 Conveyor belt
D1 Diameter
D2 Diameter
x Longitudinal axis
y Lateral axis
z Vertical axis
M Center point
V Detection volume

The invention claimed is:

1. An apparatus for detecting an object, the apparatus comprising:
   a first circular-arc-shaped support element being rotatable about a first axis of rotation;
   at least two image detection devices being disposed at said first circular-arc-shaped support element in an equiangular configuration, said at least two image detection devices each having a respective matrix sensor;
   at least one second circular-arc-shaped support element being rotatable relative to said first circular-arc shaped support element about a second axis of rotation, said at least one second circular-arc-shaped support element having a center point; and
   at least two light sources disposed at said at least one second circular-arc-shaped support element in an equiangular configuration, all of said at least two light sources being aligned toward said center point and said at least two light sources having mutually different illumination directions;
   said first axis of rotation and said second axis of rotation intersecting each other at least at one point of intersection.

2. The apparatus according to claim 1, wherein said plurality of light sources is equal in number to said plurality of image detection devices.

3. The apparatus according to claim 1, wherein said image detection devices are disposed at said first circular-arcshaped support element and said light sources are disposed at said at least one second circular-arc-shaped support element in such a way that, in at least one angular position of said first circular-arc-shaped support element, said at least one second circular-arc-shaped support element is positioned to place at least one image detection device and at least one light source along a radial line.

4. The apparatus according to claim 1, wherein at least one of said first circular-arc-shaped support element or said at least one second circular-arc-shaped support element have a semicircle-shaped construction.

5. The apparatus according to claim 1, wherein said first axis of rotation and said second axis of rotation are superimposed on one another.

6. The apparatus according to claim 1, which further comprises at least one first actuator for moving said first circular-arc-shaped support element, and at least one second actuator for moving said at least one second circular-arc-shaped support element.

7. The apparatus according to claim 1, wherein said first circular-arc-shaped support element is movable into at least a predetermined plurality of different angular positions relative to said first axis of rotation.

8. The apparatus according to claim 1, wherein said at least one second circular-arc-shaped support element is movable into at least a predetermined plurality of different angular positions relative to said second axis of rotation.

9. The apparatus according to claim 1, wherein said light sources are ring lights.

10. A method for detecting an object, the method comprising the following steps:
providing an apparatus for detecting an object, the apparatus including a first circular-arc-shaped support element being rotatable about a first axis of rotation, at least two image detection devices being disposed at the first circular-arc-shaped support element in an equiangular configuration, the at least two image detection devices each having a respective matrix sensor, at least one second circular-arc-shaped support element being rotatable relative to the first circular-arc shaped support element about a second axis of rotation, the at least one second circular-arc-shaped support element having a center point, and at least two light sources disposed at the at least one second circular-arc-shaped support element in an equiangular configuration, the first axis of rotation and the second axis of rotation intersecting each other at least at one point of intersection;
aligning all of the at least two light sources toward the center point and directing the at least two light sources in mutually different illumination directions;
setting at least one illumination state by setting an angular position of the at least one second support element and by setting an activation state of at least one of the light sources;
setting at least one imaging state by setting an angular position of the first support element and by setting an activation state of at least one of the image detection devices; and
using each of the activated image detection devices to generate an image in the set illumination state and imaging state.

11. The method according to claim 10, which further comprises setting at least one of a predetermined plurality of mutually different imaging states or a predetermined plurality of mutually different illumination states, and using each of the activated image detection devices to generate an image in each set illumination state and imaging state.

12. The method according to claim 11, which further comprises setting a plurality of different imaging states, setting a plurality of different angular positions of the at least one second circular-arc-shaped support element in each respective set imaging state, and sequentially activating the light sources in each set angular position of the at least one second circular-arc-shaped support element.

13. The method according to claim 11, which further comprises carrying out the setting of the imaging and illumination states in such a way that the angular positions of the first circular-arc-shaped support element and of the at least one second circular-arc-shaped support element are the same.

14. The method according to claim 10, which further comprises:
providing a spherical surface along which the first circular-arc-shaped support element or the at least one second circular-arc-shaped support element is movable;
moving an object through a spherical volume with a predetermined movement direction, the spherical volume being associated with the spherical surface; and
setting the imaging and illumination states in dependence on a position of the object in such a way that the circular-arc-shaped support elements and the object are moved relative to one another with no collision occurring between the object and the circular-arc-shaped support elements.

15. The method according to claim 10, which further comprises determining at least one of geometric information or material information of an imaged object in dependence on generated imaging information.

* * * * *